Oct. 3, 1961    E. B. CLAIBORNE ET AL    3,002,962
POLYMERIZATION DILUENT TREATMENT
Filed Oct. 28, 1959
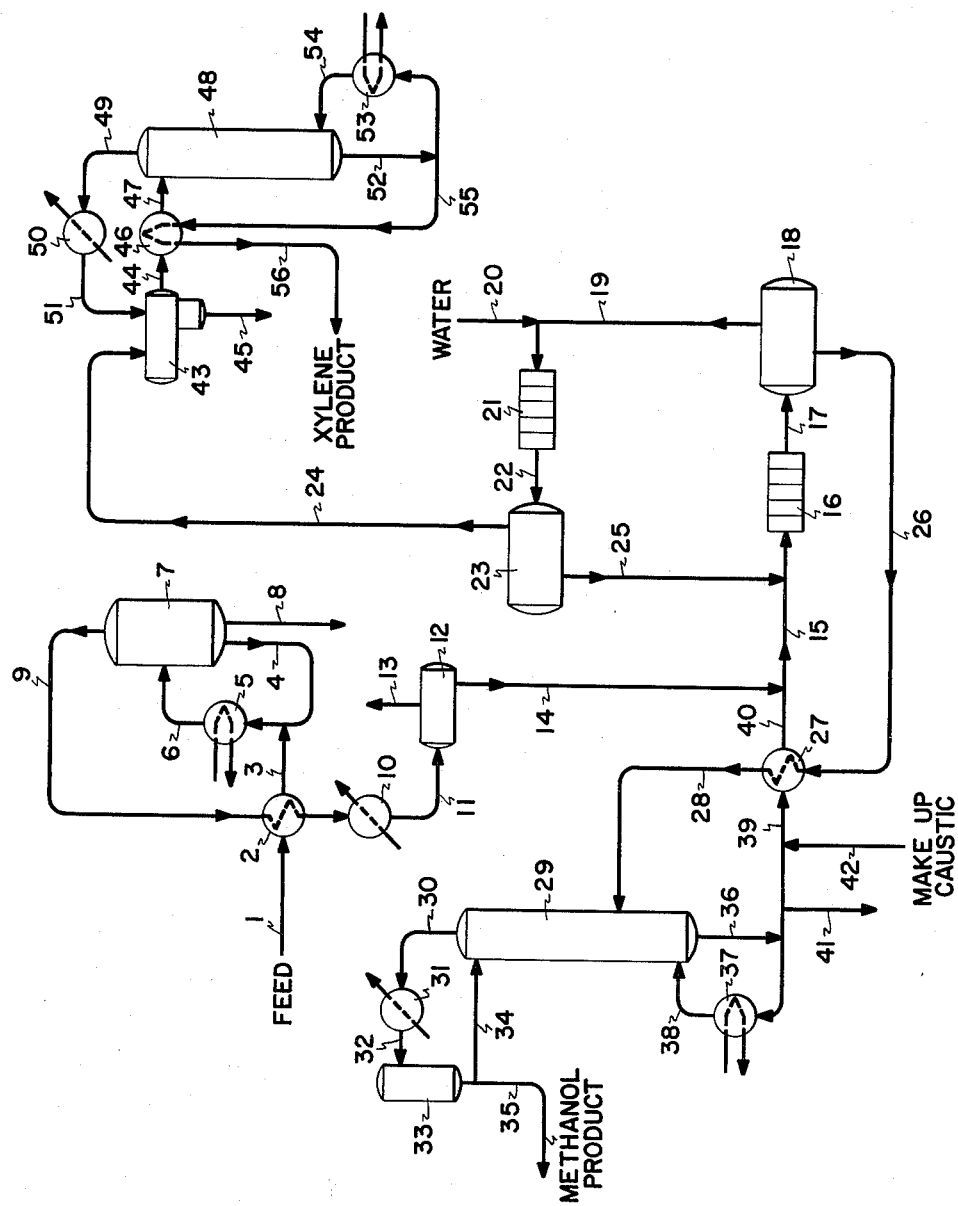
Earl Boue Claiborne
Ralph H. Schatz    INVENTORS
BY L. Chasan
PATENT ATTORNEY 3,002,962
POLYMERIZATION DILUENT TREATMENT
Earl Boue Claiborne, Baton Rouge, La., and Ralph H. Schatz, Westfield, N.J., assignors to Esso Research and Engineering Company, a corporation of Delaware
Filed Oct. 28, 1959, Ser. No. 849,265
7 Claims. (Cl. 260—93.7)

This invention relates to an improved method of obtaining more satisfactory polymer products from the low pressure polymerization of alpha olefins. More particularly it relates to a process for treating the polymerization diluent mixture so as to separate the components in a form suitable for re-utilization in the process.

The low pressure polymerization and copolymerization of alpha olefins and diolefins with catalyst systems made up of a partially reduced, heavy, transition metal halide and a reducing metal-containing compound to high density, often isotactic, high molecular weight, solid, relatively linear products has been assuming ever increasing importance and is now well known.

For the purpose of convenience details of the low presure catalytic process and the products obtained thereby are presented below, although it should be realized that these by themselves constitute no part of this invention.

The alpha olefinic feeds utilized in polymerization and copolymerization include $C_2$–$C_6$, e.g. ethylene, propylene, butene-1, hexene-1, etc., with ethylene and propylene preferred.

The process is described in the literature, e.g. see Belgian Patent 538,782, and "Scientific American," September 1957, pages 98 et seq.

In the process the polymers are prepared by polymerizing the monomer with the aid of certain polymerization catalysts. The catalysts are solid, insoluble reaction products obtained by partially reducing a heavy metal compound of a group IV–B, V–B and VI–B metal of the periodic system, such as vanadium tetrachloride, or a titanium halide, e.g. $TiCl_4$, $TiBr_4$, etc., preferably with metallic aluminum. The preferred catalyst of this type is usually prepared by reducing 1 mole of titanium tetrahalide, usually tetrachloride, with about one-third mole of aluminum to give a material corresponding to $TiCl_3 \cdot 0.33\ AlCl_3$, thus containing cocrystallized $AlCl_3$. (For further details see copending U.S. application Serial No. 578,198, filed April 6, 1956 and Serial No. 766,376, filed October 19, 1958.) The product is then activated with a metal alkyl, e.g. an aluminum alkyl compound corresponding to the formula RR'AlX. In this formula R, R' and X preferably are alkyl groups of 2 to 8 carbon atoms, although X may alternatively be hydrogen or a halogen, notably chlorine. Typical examples of the aluminum alkyl compounds are aluminum triethyl, aluminum sesquichloride, aluminum triisobutyl, etc.

The monomer is then contacted with the resulting catalyst in the presence of an inert hydrocarbon diluent or solvent. Aromatics that have been shown to be particularly useful for this purpose include benzene, toluene and xylene.

The polymerization is conveniently effected at temperatures of about 50° to 100° C. and pressures ranging from about 0 to 500 p.s.i.g., usually 0 to 100 p.s.i.g. The catalyst concentration in the polymerization zone is preferably in the range of about 0.03 to 0.5 wt. percent based on total liquid and the polymer product concentration in the polymerization zone is preferably kept between about 5 to 15 wt. percent based on total contents so as to allow easy handling of the polymerized mixture. The proper polymer concentration can be obtained by having enough of the inert diluent present or by controlling the polymerization short of 100% conversion.

When the desired degree of polymerization has been reached, a $C_1$ to $C_3$ alkanol such as methanol or isopropyl alcohol desirably in combination with a chelating agent such as acetylacetone is normally added to the reaction mixture for the purpose of dissolving and deactivating the catalyst, removing some catalyst residues from the polymer and for precipitating the crystalline polymer product from solution. The resultant alkanol-aromatic-acetylacetone mixture is separated from the precipitated polymer by conventional means such as filtration or centrifuging. Since the polymer product requires additional washing, the resultant alkanol-aromatic-acetylacetone filtrate is fractionated and the predominantly alcohol stream is used again to wash the polymer cake which is then dried. The alkanol-aromatic filtrate to be separated usually has an alcohol to aromatic weight ratio in the range of 0.2 to 1.5/1, with an acetylacetone concentration of 40 p.p.m. to 5000 p.p.m. based on the total liquid (alcohol+aromatic).

The polymers produced have number average molecular weights in the range of about 100,000 to 300,000 or even as high as 3,000,000 as determined by the intrinsic viscosity method using the I. Harris correlation (J. Polymer Science, 8, 361, 1952). The polymers can have a high degree of crystallinity and a low solubility in n-heptane.

It is to be understood that the term "low pressure" polymer as used herein connotes material prepared in the indicated manner and includes homo- and copolymers.

The polymer product obtained has in many cases been characterized by an undesirable odor. With inhibited non-oxidized polymers this odor arises from small amounts of retained hydrocarbons, e.g. xylene. The distillation to fractionate the alkanol-aromatic-acetylacetone mixture separated from the precipitate gives an alkanol stream containing appreciable quantities of hydrocarbons because of azeotrope or near-azeotrope formation, particularly in the case of benzene and toluene. The use of the aromatic containing alkanol in the washing step results in a minimum aromatic content in the liquid on the polymer of about 5 to 10 wt. percent in the case of xylene. The retained hydrocarbon is difficult to remove in the subsequent drying operation.

It is also necessary to rid the diluent of acetylacetone before it can be recycled because the acetylacetone is a polymerization poison at levels above 10 p.p.m. Acetylacetone build up in recycled alkanol wash liquid is also untenable because of the introduction of metallic impurities and discoloration into the product. Thus, the acetylacetone cannot be allowed to go overhead or out of the bottom of the alcohol diluent fractionator unless these streams are further processed to remove the acetylacetone. Separation of the xylene from the acetylacetone by distillation techniques presents difficulties because of their identical boiling points.

This invention provides an improved integrated method of overcoming these difficulties. The method comprises extracting the polymerization diluent mixture with an aqueous caustic solution to remove acetylacetone. The treated mixture is separated into a hydrocarbon-rich organic phase and an aqueous alkanol-acetylacetone phase. These phases are separately distilled to take as a bottoms product a dry essentially alkanol-acetylacetone-free hydrocarbon stream. A relatively hydrocarbon-acetylacetone-free alkanol stream is obtained by distillation of the aqueous phase. These streams can then be re-utilized in the process, the alkanol to wash the precipitated polymer product and the hydrocarbon in the polymerization step. Further details follow.

The aqueous caustic solutions utilized comprise the sodium hydroxide and potassium hydroxide solutions known in the art, typically in concentrations of 0.5 to 4 wt. percent.

The hydrocarbon stream taken as a bottoms stream by the process of this invention contains no more than 5 to 10 p.p.m. of water and alkanol and less than 5 p.p.m. acetylacetone. The alkanol stream taken overhead from that distillation contains a minimum of 95 wt. percent, usually 98 wt. percent alkanol with the balance hydrocarbon and from 10 to 1000 p.p.m. water.

This invention will be better understood by reference to the flow diagram and the following examples.

*Example 1*

To illustrate this invention an evaporator overhead stream containing a 50–50 weight percent of methyl alcohol and xylene with 46 p.p.m. acetylacetone was caustic washed with 2% caustic followed by a water wash. After separation of the layers the xylene layer contained 0.9 p.p.m. acetylacetone and after drying by distillation was suitable for recycle to the polymerization section. The acetylacetone content of the methyl alcohol caustic layer is unimportant since the alcohol is taken overhead in a distillation which will leave the high boiling acetylacetone as bottoms and yield methyl alcohol as an overhead stream with a minimum purity of 95%.

This procedure is compared with the conventional method whereby the methanol and xylene are separated by distillation into a 90% methanol 10% xylene overhead stream and a methyl alcohol free xylene stream containing all the acetylacetone, followed by caustic and water washing the xylene stream. It is found that the caustic washing step will remove an insufficient quantity of the acetylacetone which remains in the xylene bottoms stream. This fact is illustrated by a laboratory caustic and water wash of a typical xylene bottoms stream from this type of operation. In this illustration the xylene contained 152 p.p.m. acetylacetone and was washed with 2% caustic followed by water, both in a 1/1 ratio of oil to the aqueous phase. The mixing efficiency and residence time employed ("Dispersator" mixing for 10 minutes) were not practical for large scale operation but still removed only 88% of the acetylacetone, thus leaving 18 p.p.m. acetylacetone in the xylene which should have been ready for drying by distillation prior to recycle to the polymerization section. This quantity of acetylacetone, 18 p.p.m., is sufficient to poison the polymerization reaction and this procedure is not satisfactory for obtaining a re-useable xylene.

*Example 2*

In the drawing, 5 and 7 represent a vaporizer system in which a methanol-xylene mixture, which is the filtrate solution separated from the polymer product, is vaporized away from dissolved low molecular weight, waxy polymer and polymerization catalyst residues. The methanol-xylene mixture containing 1013 lbs. per hour of xylene, 811 lbs. per hour of methanol, 4 lbs. per hour of low molecular weight, waxy polymer, and 1 lb. per hour catalyst residues and acetylacetone is fed through line 1 to preheat exchanger 2 through lines 3 and 4 to vaporizer 5 and through line 6 to vaporizer drum 7, wherein a methanol-xylene vapor stream is separated from waxy polymer and catalyst residues. Vaporizer drum 7 operates at a pressure of 6 p.s.i.g. and a liquid temperature of 275° F. A bottoms stream from vaporizer drum 7 containing 53 lbs. per hour of xylene, 1 lb. per hour of methanol, 4 lbs. per hour of waxy polymer and 1 lb. per hour of chelated catalyst residues is removed through line 8 and discarded. The overhead vapor stream containing 960 lbs. per hour of xylene, 810 lbs. per hour of methanol, and 32.5 p.p.m. acetylacetone flows through line 9 to exchangers 2 and condenser 10. The condensed liquid flows through line 11 to distillate drum 12. Uncondensed vapors are vented from distillate drum 12 through line 13.

The methanol-xylene mixture containing acetylacetone is extracted with an aqueous caustic solution in mixer-settler combination 16 and 18 to convert acetylacetone to sodium acetylacetonate and to extract the sodium acetylacetonate and methanol into the aqueous caustic phase. Liquid from vessel 12 is sent through lines 14 and 15 to orifice mixer 16 wherein the methanol-xylene stream is contacted with an aqueous caustic stream. The aqueous caustic stream is comprised of 420 lbs. per hour of water and 6 lbs. per hour of sodium hydroxide which is fed through line 40, and 200 lbs. per hour of water saturated with xylene which is the aqueous phase from settler 23 sent through line 25. The extracted methanol-xylene-acetylacetone mixture flows through line 17 to settler 18 where two phases form; an aqueous caustic-methanol extract phase containing dissolved sodium acetylacetonate, and a xylene raffinate phase containing a small amount of methanol and water but substantially free of acetylacetone. Settler 18 is operated at 150° F. and 5 p.s.i.g.

The xylene raffinate phase from settler 18 is sent through line 19 to orifice mixer 21 where it is contacted with 200 lbs. per hour of fresh water introduced through line 20 to extract entrained caustic and a small amount of methanol. The water-xylene mixture from mixer 21 flows through line 22 to settler 23 whereupon on settling two phases form; one a xylene raffinate phase, the other a water extract phase which is combined through line 25 with the aqueous caustic and methanol-xylene feed to mixer 16. Settler 23 operates at 150° F. and a pressure of 25 p.s.i.g. The xylene raffinate phase from settler 23 comprised of 944 lbs. per hour of xylene, 1 lb. per hour of water, and only 1 p.p.m. of acetylacetone is sent through line 24 to vessel 43.

Fractionating tower 48 is a drying tower from which a xylene stream containing less than 10 p.p.m. water is taken as a bottoms product. Wet xylene containing a small amount of methanol flows from vessel 43 through line 44 to preheat exchanger 46 through line 47 to the top plate of tower 48. Tower 48 contains 20 distillation plates and operates at a pressure of 5 p.s.i.g. which corresponds to an overhead temperature of 294° F. and a bottoms temperature of 320° F. The overhead vapor stream from tower 48 passes through line 49 to condenser 50 and then through line 51 to settling vessel 43. Water and methanol which separate out from the xylene mixture as a second phase are withdrawn from settler 43 through line 45 and discarded or combined with the feed to tower 29. Part of the tower bottoms are sent through line 52 into reboiler 53 through line 54 so that the vapors amounting to 283 lbs. per hour are returned to tower 54. The remaining bottom stream consisting of 944 lbs./hr. of xylene containing 10 p.p.m. or less of water and methanol flows through line 55 to exchanger 46 where heat is exchanged with feed to tower 48 and then through line 56 to the polymerization reactor section for reuse as a polymerization diluent.

The extract phase from settler 18 comprised of 809 lbs. per hour methanol, 16.5 lbs. per hour xylene, 619 lbs. per hour of water, and 6 lbs. per hour of sodium hydroxide flows through line 26 to preheat exchanger 27 and then to distillation tower 29. Distillation tower 29 fractionates the methanol-water mixture to recover a dry methanol stream overhead containing a small amount of xylene and a bottoms stream of water containing sodium hydroxide, part of which is recycled to the methanol-xylene extraction step. The methanol-water feed to tower 29 is introduced through line 28 to the 40th plate from the top of the 60-plate tower. Tower 29 is operated at 5 p.s.i.g. with an overhead temperature of 166° F. and a bottoms temperature of 238° F. The overhead vapors from tower 29 amounting to 1768 lbs. per hours flow through line 30 into condenser 31 through line 32 into reflux drum 33. The reflux stream sent through line 34 amounts to 924 lbs. per hour of methanol and 19 lbs. per hour of xylene. The remainder of the condensed overhead vapors, amounting to 808 lbs. per hour of methanol, 16.5 lbs. per hour of xylene, and containing less than 100 p.p.m. of water and essentially no acetylacetone, is withdrawn through line 35 and returned to the polymer filtration and washing section of the plant.

Part of the bottoms stream from tower 29 is withdrawn through line 36 and sent to reboiler 37 and through line 38 so that the vapors are returned to tower 29. The remaining bottoms stream consisting of 619 lbs. per hour of water, 1 lb. per hour of methanol, 6 lbs. per hour of sodium hydroxide and sodium acetylacetonate are sent through line 39 through a preheat exchanger 27, wherein heat is exchanged to the feed to tower 29 and then through lines 40 and 15 to mixer 16. 200 lbs. per hour of water containing 2 lbs. per hour sodium hydroxide and sodium acetylacetonate are purged through line 41. Makeup sodium hydroxide is added through line 42.

The advantages of this invention will be apparent to those skilled in the art. The lower alkanol and xylene are obtained in condition for re-use. Polymer products of improved odor and purity are obtained with little, if any, increase in cost because of the improved recycle streams made available. The drying operation is also simplified because of lowered aromatic content in the polymer cake liquid and consequently lower equipment loads.

The process of this invention is applicable to the use of hydrocarbon diluents other than aromatics. Thus it also works very well with $C_3$-$C_9$ aliphatics, e.g. heptane, as well as alicyclic materials, e.g. cyclohexane.

If desired, the alkanol stream prior to its use in working the polymer product can be further dehydrated by physical means.

It is to be understood that this invention is not limited to the specific examples which have been offered merely as illustrations and that modifications may be made without departing from the spirit of the invention.

What is claimed is:

1. In a process for polymerizing a $C_2$-$C_6$ alpha mono olefin in the presence of a catalyst containing a partially reduced, heavy, transition metal halide of a group IVB-VIB metal and a metal alkyl compound corresponding to the formula RR'AlX, wherein R and R' are alkyl groups having from 2 to 8 carbon atoms and X is selected from the group consisting of alkyl, hydrogen and halogen in a hydrocarbon diluent, wherein a $C_1$ to $C_3$ alkanol is added to the reaction system to precipitate solid polymer product, and acetylacetone is also added to remove catalyst residues from the polymer followed by separation of the resultant diluent-alkanol-acetylacetone mixture therefrom, the improved integrated operation which comprises the steps of removing soluble polymers from the alkanol-diluent-acetylacetone mixture; extracting the mixture with an aqueous caustic solution; separating the thus treated mixture into a diluent-rich organic phase and an aqueous alkanol-acetylacetone phase; distilling the diluent phase to take as a bottoms product an essentially alkanol-acetylacetone-water free hydrocarbon stream; distilling the aqueous phase to obtain a relatively hydrocarbon-acetylacetone free alkanol stream and leaving a caustic stream and utilizing the alkanol stream to wash the precipitated polymer product.

2. The process of claim 1 including the additional step of recycling the hydrocarbon stream to the polymerization step.

3. The process of claim 1 including the additional step of recycling the caustic bottoms to the extraction step.

4. The process of claim 1 in which the alkanol is methanol.

5. The process of claim 4 in which the hydrocarbon is xylene.

6. The process of claim 5 in which the olefin is propylene.

7. The process of claim 1 in which the diluent-alkanol-acetylacetone mixture separated from the precipitated polymer has an alkanol/hydrocarbon weight ratio in the range of 0.2–1.5/1, an acetylacetone concentration of 50 to 5000 p.p.m. and the bottoms hydrocarbon stream has a maximum of 10 p.p.m. water and 5 p.p.m. of acetylacetone.

References Cited in the file of this patent

UNITED STATES PATENTS 2,921,057    Mertzweiller _____ Jan. 12, 1960